(12) United States Patent
Li et al.

(10) Patent No.: US 8,606,499 B2
(45) Date of Patent: Dec. 10, 2013

(54) METHOD AND APPARATUS FOR DETERMINING PARKING AREA LOCATION INFORMATION

(75) Inventors: Dong Li, Columbus, OH (US); Dominic Letz, Berlin (DE)

(73) Assignee: Navteq B.V., Veldhoven (NL)

( * ) Notice: Subject to any disclaimer, the term of this patent is extended or adjusted under 35 U.S.C. 154(b) by 45 days.

(21) Appl. No.: 13/328,202

(22) Filed: Dec. 16, 2011

(65) Prior Publication Data
US 2013/0158853 A1 Jun. 20, 2013

(51) Int. Cl.
*G01C 21/00* (2006.01)

(52) U.S. Cl.
USPC ............... 701/400; 701/23; 340/932.2

(58) Field of Classification Search
USPC ............. 701/23–25, 400, 533, 467–470, 438; 340/932.2
See application file for complete search history.

(56) References Cited

U.S. PATENT DOCUMENTS

| | | | |
|---|---|---|---|
| 6,683,539 B2 | 1/2004 | Trajkovic et al. | |
| 7,538,690 B1 | 5/2009 | Kaplan et al. | |
| 7,899,583 B2 | 3/2011 | Mendelson | |
| 2011/0106426 A1* | 5/2011 | Tertoolen | 701/201 |

FOREIGN PATENT DOCUMENTS

| | | |
|---|---|---|
| EP | 2282169 A1 | 2/2011 |
| EP | 2469303 A1 | 6/2012 |
| WO | 2007083997 A1 | 7/2007 |

OTHER PUBLICATIONS

International Search Report corresponding to Application No. PCT/FI2012/051225, mailed on Apr. 15, 2013.
Written Opinion of the International Searching Authority corresponding to Application No. PCT/FI2012/051225, mailed on Apr. 15, 2013.
Notification of Transmittal of the International Search Report and the Written Opinion of the International Searching Authority or the Declaration corresponding to Application No. PCT/FI2012/051225, mailed on Apr. 15, 2013.

* cited by examiner

*Primary Examiner* — Yonel Beaulieu
(74) *Attorney, Agent, or Firm* — Ditthavong Mori & Steiner, P.C.

(57) ABSTRACT

An approach is provided for determining parking information for a place of interest. A travel platform processes one or more trace results associated with a device, a user of the device, or a combination there to determine one or more travel paths, one or more places of interest, or a combination thereof. The travel platform processes the one or more travel paths to determine one or more parking areas associated with the one or more places of interest. The travel platform then presents the one or more parking areas associated with the one or more travel paths, the one or more places of interest, or a combination thereof.

20 Claims, 8 Drawing Sheets

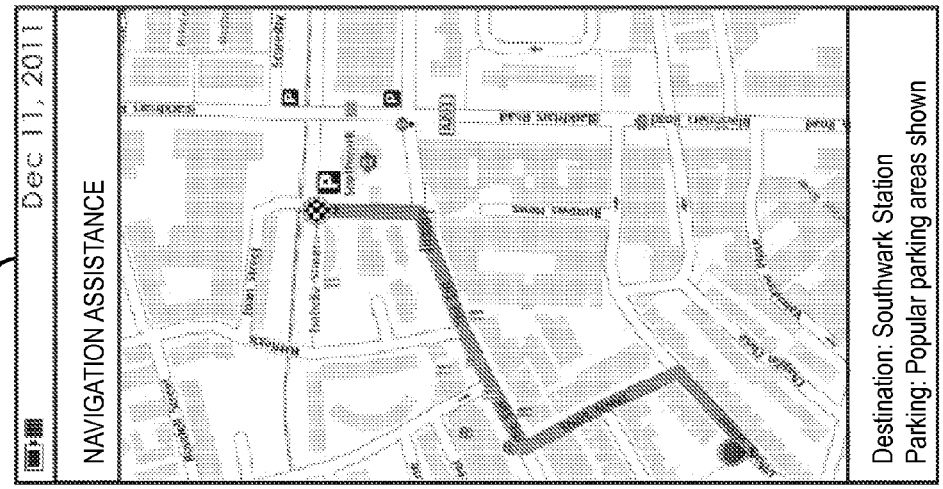
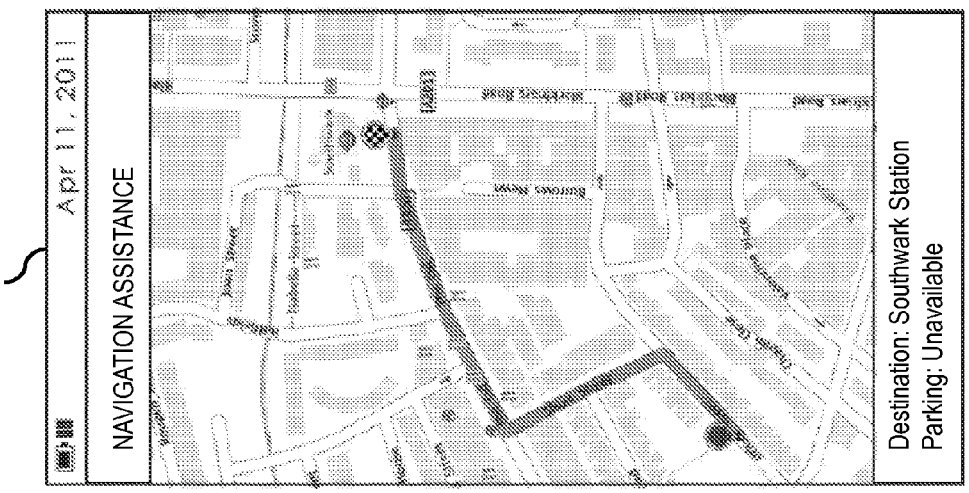
FIG. 5

METHOD AND APPARATUS FOR DETERMINING PARKING AREA LOCATION INFORMATION

BACKGROUND

Service providers and device manufacturers (e.g., wireless, cellular, etc.) are continually challenged to deliver value and convenience to consumers by, for example, providing compelling network services. One area of interest has been the development of location-based services and personal navigation to provide users of mobile devices (e.g., mobile phones) with driving assistant services to improve the quality of their travels. By way of example, many mobile devices are equipped with global positioning sensors (GPS) and navigation and/or mapping applications for presenting location-based information (e.g., maps, travel directions, route details, places of interest (POIs), and the like) to users. However, there is a lack of parking information available for places of interest. Accordingly, service providers and device manufacturers face significant technical challenges in providing a service that determines parking information for a place of interest.

SOME EXAMPLE EMBODIMENTS

Therefore, there is a need for an approach for determining parking information for a place of interest.

According to one embodiment, a method comprises processing and/or facilitating a processing of one or more trace results associated with a device, a user of the device, or a combination thereof to determine one or more travel paths, one or more places of interest, or a combination thereof. The method also comprises processing and/or facilitating a processing of the one or more travel paths to determine one or more parking areas associated with the one or more places of interest. The method further comprises causing, at least in part, a presentation of the one or more parking areas associated with the one or more travel paths, the one or more places of interest, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more trace results associated with a device, a user of the device, or a combination thereof to determine one or more travel paths, one or more places of interest, or a combination thereof. The apparatus is also caused to process and/or facilitate a processing of the one or more travel paths to determine one or more parking areas associated with the one or more places of interest. The apparatus is further caused to cause, at least in part, a presentation of the one or more parking areas associated with the one or more travel paths, the one or more places of interest, or a combination thereof.

According to another embodiment, a computer-readable storage medium carries one or more sequences of one or more instructions which, when executed by one or more processors, cause, at least in part, an apparatus to process and/or facilitate a processing of one or more trace results associated with a device, a user of the device, or a combination thereof to determine one or more travel paths, one or more places of interest, or a combination thereof. The apparatus is also caused to process and/or facilitate a processing of the one or more travel paths to determine one or more parking areas associated with the one or more places of interest. The apparatus is further caused to cause, at least in part, a presentation of the one or more parking areas associated with the one or more travel paths, the one or more places of interest, or a combination thereof.

According to another embodiment, an apparatus comprises means for processing and/or facilitating a processing of one or more trace results associated with a device, a user of the device, or a combination thereof to determine one or more travel paths, one or more places of interest, or a combination thereof. The apparatus also comprises means for processing and/or facilitating a processing of the one or more travel paths to determine one or more parking areas associated with the one or more places of interest. The apparatus further comprises means for causing, at least in part, a presentation of the one or more parking areas associated with the one or more travel paths, the one or more places of interest, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a diagram of user interfaces utilized in the processes of FIGS. 3 and 4, according to various embodiments;

DESCRIPTION OF SOME EMBODIMENTS

Examples of a method, apparatus, and computer program for providing parking information for places of interest are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
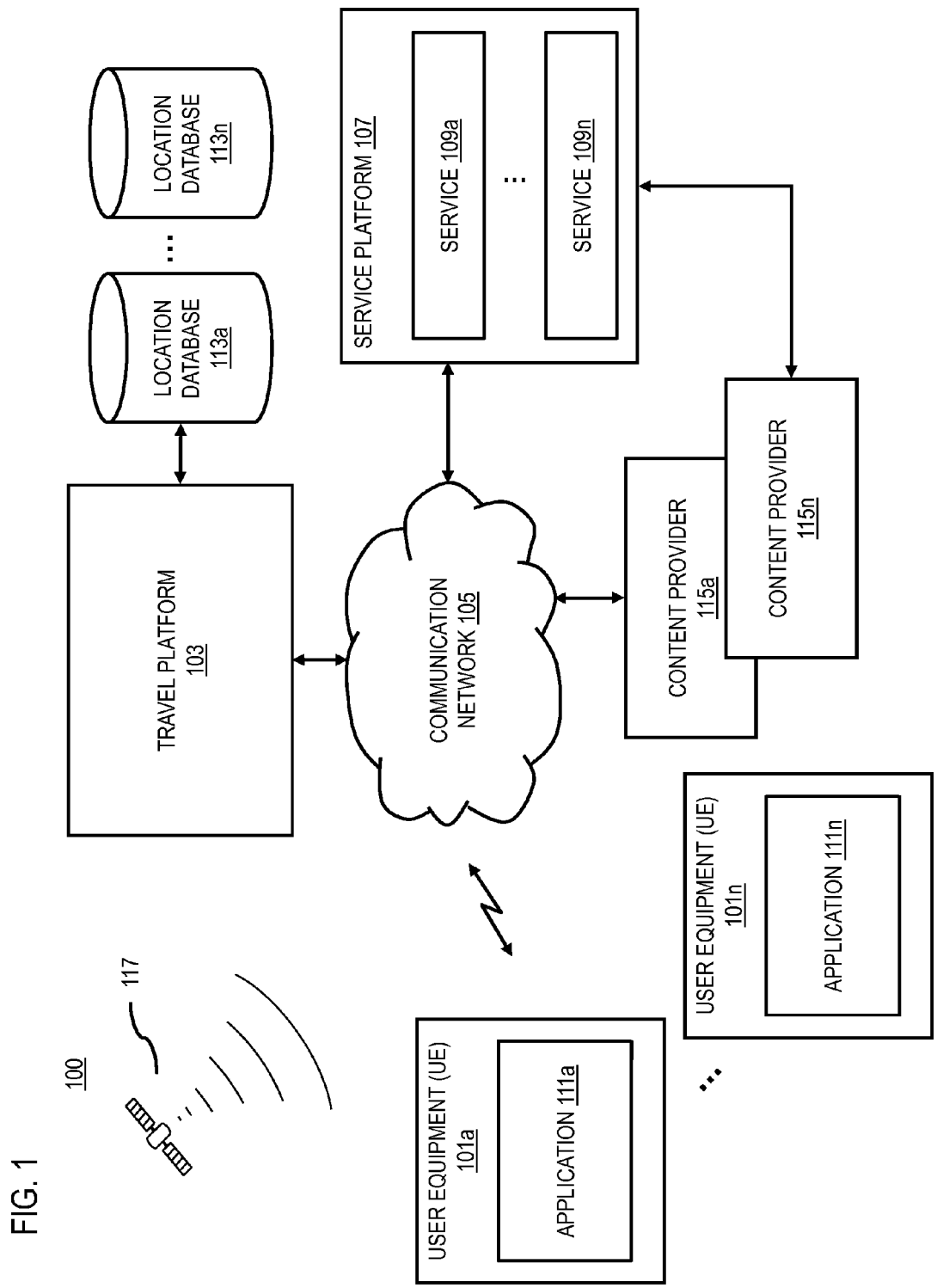
FIG. 1 is a diagram of a system capable of determining parking information for a place of interest, according to one embodiment.

FIG. 1 is a diagram of a system capable of determining parking information for a place of interest, according to one embodiment. As previously discussed, service providers and device manufactures are increasingly interested in developing location-based services and personal navigation to provide users of mobile devices (e.g., mobile phones) with driving assistant services to improve the quality of their travels. Further, it is increasingly popular for service providers and device manufacturers to bundle or make available navigation and/or mapping services (e.g., turn-by-turn navigation) on an array of user devices (e.g., mobile handsets, computers, navigation devices, etc.). Such devices may utilize location-based technologies (e.g., Global Positioning System (GPS) receivers, cellular triangulation, assisted-GPS (A-GPS), etc.) to provide a user with navigation and/or mapping information. Such information is particularly helpful when a user is determining directions to a place of interest that is unfamiliar to the user. However, there is a lack of available information about parking areas associated with places of interest.

By way of example, a user may want to travel to a new place of interest (e.g., a restaurant, a cinema, a stadium, etc.). The user can first enter the address of the place of interest into a navigation application associated with a mobile device (e.g., mobile phone) using the user interface (UI) of the mobile device. The navigation application may then provide the user with turn-by-turn navigation to assist the user to drive from a starting location (e.g., a home or office) to the place of interest (e.g., a restaurant). However, the travel the navigation application is unable to determine a parking area for the place of interest at the onset of the travel or when the user reaches the place of interest, when such information would be most useful. Further, in one example, the navigation application is also unable to provide the user with walking directions from the parking area to the place of interest. Again, this information is particularly useful in situations that are unfamiliar to the user.

To address this problem, a system 100 of FIG. 1 introduces the capability of determining parking information for a place of interest. According to one embodiment, the system 100 may initially determine one or more parking areas that are already correlated with a place of interest based, at least in part, on parking information contained within one or more databases, available from one or more mapping and/or navigation services, or a combination thereof. In another embodiment, the system 100 may need to determine parking information for a place of interest not already contained within the one or more databases, available from the one or more mapping and/or navigation services, or a combination thereof. In this instance, the system 100 first determines one or more trace results associated with GPS receivers within a mobile device (e.g., a mobile phone) during one or more travel paths between a starting destination (e.g., a home or office) and a place of interest (e.g., a restaurant, a cinema, a stadium, etc.). The system 100 then analyzes the one or more trace results to correlate the place of interest (e.g., a restaurant) with one or more parking areas in close proximity to the place of interest. More specifically, in one embodiment, the system 100 determines at least one driving segment and at least one walking segment associated with the one or more travel paths based, at least in part, on a speed profile associated with the one or more modes of travel (e.g., driving, walking, etc.) and already stored within one or more databases.

The system 100 then attempts to correlate the end of the walking segment with a place of interest based, at least in part, on location-based data associated with the end of the walking segment and the place of interest. Once the system 100 determines that the end of the walking segment is, in fact, a place of interest, the system 100 determines whether the end of the driving segment is a parking area already stored within the one or more databases based, at least in part, on location-based information associated with the end of the driving segment and the parking area. If the system 100 determines that the parking area is not already stored within the one or more databases, the system 100 causes, at least in part, an addition of the location-based information associated with the parking area to the one or more databases. Further, the system 100 then correlates the parking area with the place of interest and causes, at least in part, a storage of the correlation within the one or more databases. In one embodiment, the correlation between the parking area and the place of interest is considered valid if more than three independent GPS traces recently (e.g., in the last six months) determined the same correlation. More specifically, the system 100 can adjust the calculus for determining the validity of the correlation between a parking area and a place of interest based on the number of GPS traces and/or correlations the system 100 determines within the one or more databases. By way example, if the system 100 determines a significant number of GPS traces for a particular correlation, the system 100 can reduce the validation period from six months to three months or even a few weeks to determine the validity of the correlation.

By way of example, when a user plans a route to the place of interest (e.g., entering the name or address of the place of interest into a navigation application) the system 100 is able to present the user with the correlated parking area. In one embodiment, the system 100 presents a user with the correlated parking area at the origin of the at least one driving segment, at the approximate end of the at least one driving segment, periodically, according to a schedule, on demand, or a combination thereof. In one embodiment, a parking area correlated with a place of interest is presented to a user based, at least in part, on the popularity of the parking area. More specifically, the popularity of the correlation is determined by the system 100 based on the number of GPS traces from different users stored within the one or more databases that show the same correlation over the last six months.

In one embodiment, once the system 100 determines a parking area is correlated with a place of interest, the system 100 is able to determine that a mobile device (e.g., a mobile phone) is at an end of the at least one driving segment and at a beginning of the at least one walking segment based, at least in part, on one or more speed profiles associated with the mobile device. In one embodiment, the system 100 can then determine one or more walking directions from the parking area to the place of interest from one or more databases, one or more mapping and/or navigation services, or a combination thereof and then present the one or more walking directions to a user at the onset of the user's walk, periodically, according to a schedule, on demand, or a combination thereof. In one embodiment, the system 100 presents one or more walking directions to a user based, at least in part, on the popularity of the walk (i.e., the number of GPS traces from different users that also determined the same walk between the parking area and the place of interest within the last six months).

As shown in FIG. 1, the system 100 comprises one or more user equipment (UE) 101a-101n (also collectively referred to as UEs 101) having connectivity to a travel platform 103 via a communication network 105. The UEs 101 may include one or more application 111a-111n (also collectively referred to as applications 111). By way of example, exemplary applications 111 may include one or more location-based applications (e.g., turn-by-turn navigation). In one embodiment, the applications 111 interface with the travel platform 103 to request and/or render location-based information (e.g., places of interest, driving and walking route guidance, estimated time of arrival (eta)), etc.). In one embodiment, the applications 111 also interface with one or more location databases 113a-113n (also collectively referred to as location databases 113). The location databases 113 may exist in whole or in part within the travel platform 103, or independently.

In one embodiment, the location databases 113 include one or more speed profiles associated with driving and walking, respectively. As previous discussed, the UEs 101 may utilize location-based technologies (GPS receivers, cellular triangulation, A-GPS, etc.) to determine location and temporal information regarding the UEs 101. For instance, the UEs 101 may include GPS receivers to obtain geographic coordinates from satellites 117 to determine the current location and time associated with the UEs 101. More specifically, the travel platform 103 first determines the one or more trace results associated with GPS receivers within a mobile device (e.g., a mobile phone). The travel platform 103 then correlates the one or more trace results with the one or more speed profiles stored in the location databases 113 to segment the one or more travel paths into at least one driving segment and at least one walking segment. In one embodiment, the location databases 113 also include location-based information (e.g., geocoded coordinates) associated with one or more parking areas and/or one or more places of interest, which the travel platform 103 can use to determine whether the end of the at least one driving segment and the end of the at least one walking segment is a parking area and a place of interest, respectively, already stored within the one or more location databases 113. If the travel platform 103 determines that the location-based information associated with the end of the at least one driving segment, the end of the at least one walking segment, or a combination thereof is not already stored in the one or more location databases 113, the travel platform 103 can cause, at least in part, the storage of the location-based information in the location databases 113 for future reference.

In one embodiment, the location databases 113 may also include one or more contexts, one or more parameters, or a combination thereof associated with one or more parking areas and one or more places of interest. By way of example, the travel platform 103 can use the one or more contexts, the one or more parameters, or a combination thereof stored within the location databases 113 to determine one or more relationships between the one or more parking areas and the one or more places of interest. More specifically, the travel platform 103 may use the one or more contexts, the one or more parameters, or a combination thereof to determine a hierarchy (e.g., a popularity) of the one or more parking areas related to a place of interest. For example, the travel platform 103 can determine based, at least in part, on the trace results stored in the location databases 113 that 50% of all drivers en route to restaurant "ABC" park their vehicles in parking area "A", 30% of the remaining drivers park their vehicles in parking area "B", and the remaining 20% parking their vehicles in parking area "C". As a result, the travel platform 103 can cause, at least in part, the presentation, recommendation, and/or promotion of parking area "A" when a user determines to travel to restaurant "ABC." In one embodiment, the travel platform 103 can determine to recalculate the trace results based, at least in part, on a higher level of granularity (e.g., the location of a user's starting destination). By way of example, the above-referenced parking percentages may only be valid for users starting one or more travel paths from the east of the place of interest.

In one embodiment, the travel platform 103 can use one or more contexts, one or more parameters, or a combination thereof within the location databases 113 to define a "parking area" as a space where parking is allowed within "x" radius of a place of interest. In another example, the travel platform 103 can use one or more contexts, one or more parameters, or a combination thereof stored within the location databases 113 to define a valid correlation between one or more parking areas and a place of interest based, at least in part, on more than three independent trace results confirming the same correlation over the last six months. Further, the travel platform 103 can use one or more contexts, one or more parameters, of a combination thereof contained with the location databases 113 to cause, at least in part, a presentation of the one or more parking areas associated with the one or more places of interest at the origin of the at least one driving segment, at the approximate end of the at least one driving segment, periodically, according to a schedule, on demand, or a combination thereof.

The UEs 101 are also connected to a service platform 107 via the communication network 105. The service platform 107 includes one or more services 109a-109n (e.g., mapping, navigation, traffic, etc.) (also collectively referred to as services 109) associated with the applications 111 to provide a user with travel-based information (e.g., turn-by-turn navigation) while he or she is en route along one or more travel paths between a starting location (e.g., a home or office) to a place of interest (e.g., a restaurant). By way of example, the services 109, the location databases 113, or a combination thereof may be updated from time-to-time by one or more content providers 115a-115n (e.g., a navigation service, a mapping service, a location-based service, etc.) (also collectively known as content providers 115). In one embodiment, once a user parks a vehicle at one or more parking areas associated with a place of interest, the user can then use the applications 111 again to interface with the services 109 to obtain one or more directions related to walking from the parking area to the place of interest. Further, in one example, the applications 111 may also interface with the location databases 113 to determine one more directions related to walking from the parking area to the place of interest. In this instance, the travel platform 103 may determine a hierarchy of the one or more walking directions within the location databases 113 based, at least in part, on the popularity of the directions.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, travel platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
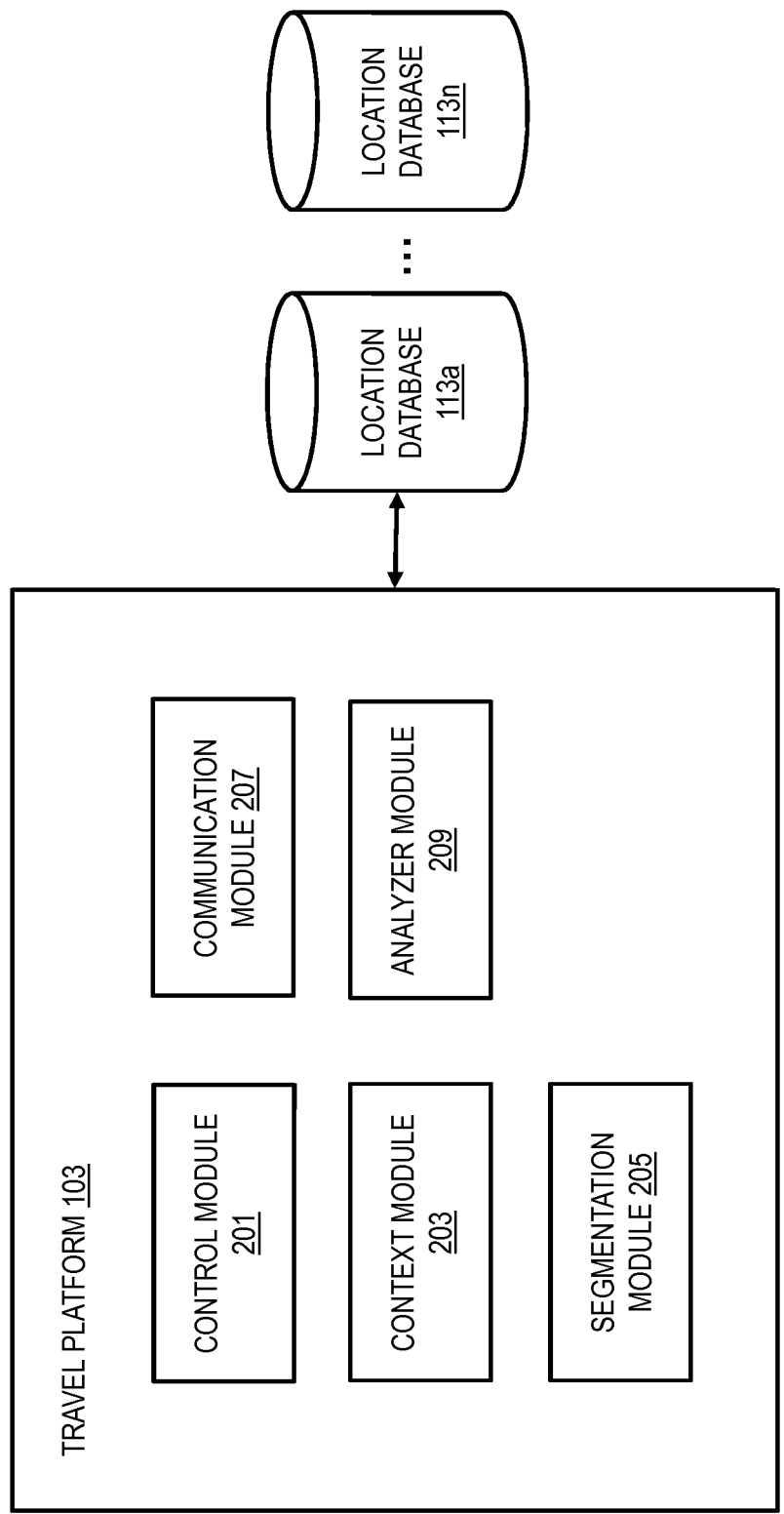
FIG. 2 is a diagram of the components of parking platform, according to one embodiment.

FIG. 2 is a diagram of the components of the travel platform 103, according to one embodiment. By way of example, the travel platform 103 includes one or more components for determining parking information for a place of interest. It is contemplated that the functions of these components may be combined in one or more components or performed by other components of equivalent functionality. In this embodiment, the travel platform 103 includes a control module 201, a context module 203, a segmentation module 205, a communication module 207, and an analyzer module 209.

The control module 201 executes at least one algorithm for executing functions of the travel platform 103. For example, the control module 201 may execute an algorithm for processing a query associated with a UE 101 for location-based data (e.g., turn-by-turn navigation) for a place of interest (e.g., a restaurant). By way of another example, the control module 201 may execute an algorithm to interact with the context module 203 to determine the geographic or temporal context or situation of a UE 101. The control module 201 also may execute an algorithm to interact with the segmentation module 205 to cause a segmentation of one or more trace results, one or more travel paths, or a combination thereof to determine at least one driving segment and at least one walking segment based, at least in part, on one or more speed profiles associated with the one or more trace results, the one or more travel paths, or a combination thereof. The control module 201 may also execute an algorithm to interact with the communication module 207 to communicate among the travel platform 103, the services 109, the applications 111, and the location databases 113. The control module 201 also may execute an algorithm to interact with the analyzer module 209 to analyze one or more trace results, one or more travel paths, one or more parking areas, one or more places of interest, or a combination thereof.

The context module 203 may determine the geographic or temporal context or situation of a UE 101 by utilizing location-based technologies (GPS receivers, cellular triangulation, A-GPS, etc.) to determine location (e.g., geographic coordinates) and temporal information (e.g., speed) regarding a UE 101 during one or more travel paths between a starting destination (e.g., a home or office) and a place of interest (e.g., a restaurant). The context module 203 may also identify whether certain conditions or triggers have been met, such as whether a particular event has occurred (e.g., initiation of a travel to a place of interest). The context module 203, in connection with the segmentation module 205, is also used to determine the location of the one or more parking areas, one or more places of interest, or a combination thereof. Further, the context module 203 may determine to store the one or more trace results, the one or more travel paths, the one or more parking areas, the one or more places of interest, or a combination thereof within the one or more location databases 113.

The segmentation module 205 segments one or more travel paths to determine at least one driving segment and at least one walking segment. In one embodiment, the segmentation module 205 processes one or more travel paths determined by the GPS sensors associated with a mobile device (e.g., a mobile phone) to determine the at least one driving segment and the at least one walking segment based, at least in part, on a speed profile associated with one or more modes of travel (e.g., driving, walking, etc.) and stored within the one or more location databases 113. In another embodiment, the segmentation module 205 may process the one or more travel paths determined by the GPS sensors to determine the at least one driving segment and the at least one walking segment based, at least in part, on a three-dimensional acceleration profile associated with one or more modes of travel and stored within one or more location databases 111. In one example, the segmentation module 205 may also determine the transition between the at least one driving segment and the at least one walking segment (e.g., where a user parked a vehicle). By way of example, if the segmentation module 205 determines that the one or more travel paths indicate an average speed normally associated with driving, the segmentation module 205 can determine with reasonable probability that the one or more travel paths represents at least one driving segment between a starting destination (e.g., a home or office) and one or more parking areas associated with the place of interest (e.g., a restaurant). Likewise, if the segmentation module 205 determines that the one or more travel paths indicates an average speed normally associated with walking (e.g., 2-4 miles per hour), the segmentation module 205 can determine with reasonable probability that the one or more travel paths represents at least one walking segment between a starting destination (e.g., one or more parking areas) and a place of interest.

The communication module 207 is used for communication between the travel platform 103, the services 109, the applications 111, and the location databases 113. The communication module 207 may be used to communicate commands, requests, data, etc. By way of example, the communication module 207 may be used to transit a request from a user interface (UI) of a UE 101 to obtain location-based information (e.g., turn-by-turn navigation) for a place of interest. In one embodiment, the communication module 207 is used to present a user with location-based information obtained from one or more location databases 113 regarding one or more parking areas associated with a place of interest. By way of example, if location-based information related to a place of interest and/or one or more related parking areas is unavailable from the location databases 113, the communication module 207, in connection with the segmentation module 205 and the analyzer module 209, can be used to transmit the location-based information to the location databases 113 for future reference. The communication module 207, in connection with the analyzer module 209, can also be used to present to a user a recommended and/or promoted parking area as the best parking option based, at least in part, on the popularity of the parking area related to a place of interest.

The analyzer module 209 is used to process one or more trace results associated with a mobile device (e.g., GPS traces) during one or more travel paths between a starting destination (e.g., a home or office) and a place of interest (e.g., a restaurant, a cinema, a stadium, etc.). The analyzer module 209 then analyzes the one or more trace results to correlate a place of interest (e.g., a restaurant) with one or more parking areas associated with the place of interest. In one embodiment, the analyzer module 209 is unable to determine a correlation between a place of interest and one or more parking areas within the location databases 113. In this instance, the analyzer module 209, in connection with the segmentation module 205, is used to determine at least one driving segment and at least one walking segment of the one or more travel paths based, at least in part, on a speed profile associated with one or more modes of travel (e.g., driving, walking, etc.) and stored within the location databases 113. In one embodiment, the analyzer module 209 is used to determine the validity of one or more correlations between one or more parking areas and a place of interest. By way of example, a correlation between a parking area and a place of interest is determined to be valid by the analyzer module 209 if the analyzer module 209 determines three independent GPS traces recently (e.g., in the last six months) showed the same correlation. In one embodiment, the analyzer module 209 is also used to determine the popularity of one or more parking areas related to a place of interest, which the communication module 207 can then recommend and/or promote to a user. For example, the analyzer module 209 is used to determine the popularity of a parking area based, at least in part, on the number of GPS traces from different users stored within the location databases 113 that show the same correlation between a parking area and a place of interest over the last six months.

Figure 3:
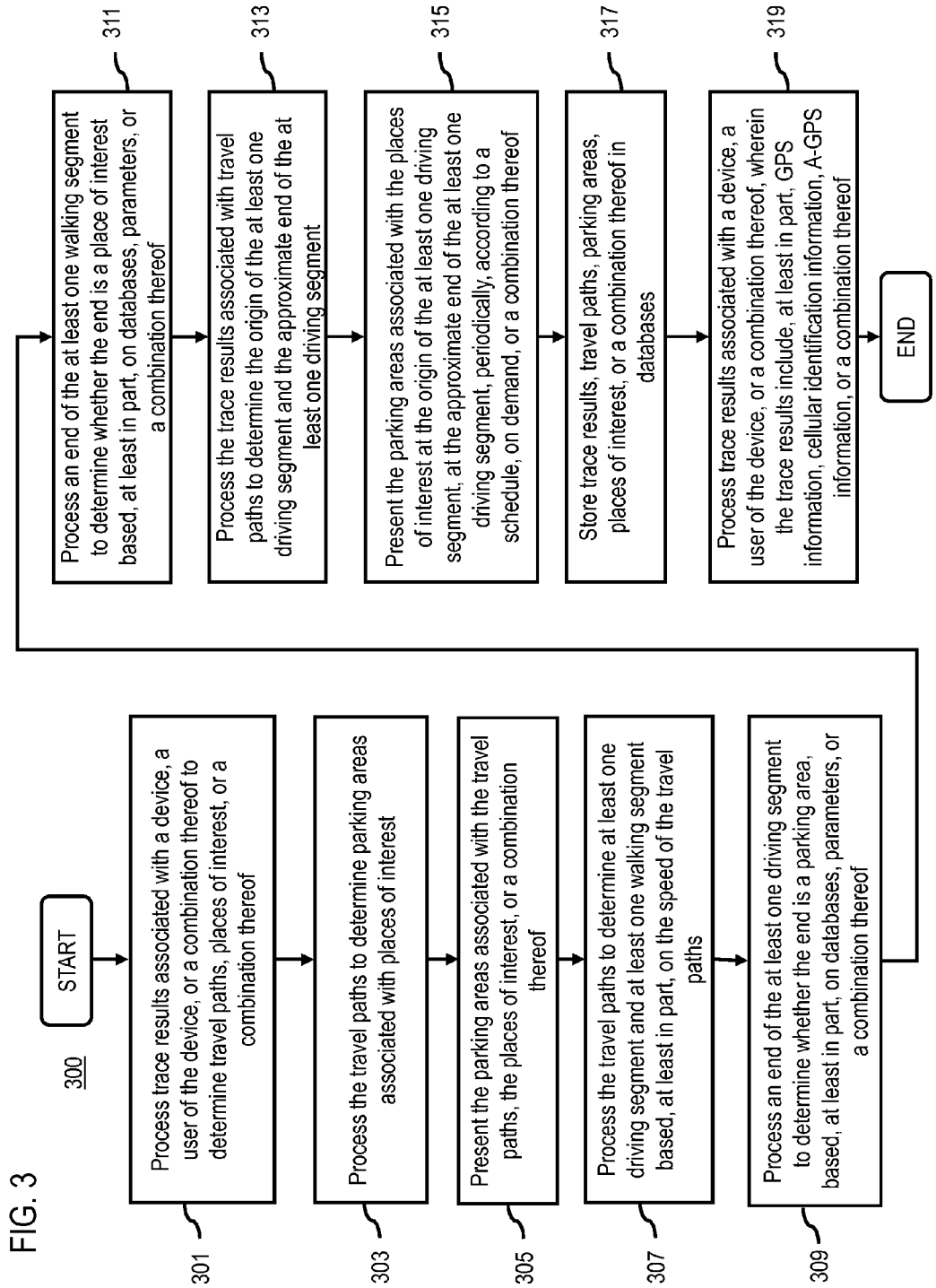
FIGS. 3 and 4 are flowcharts of processes for determining parking information for a place of interest, according to one embodiment.
Figure 4:
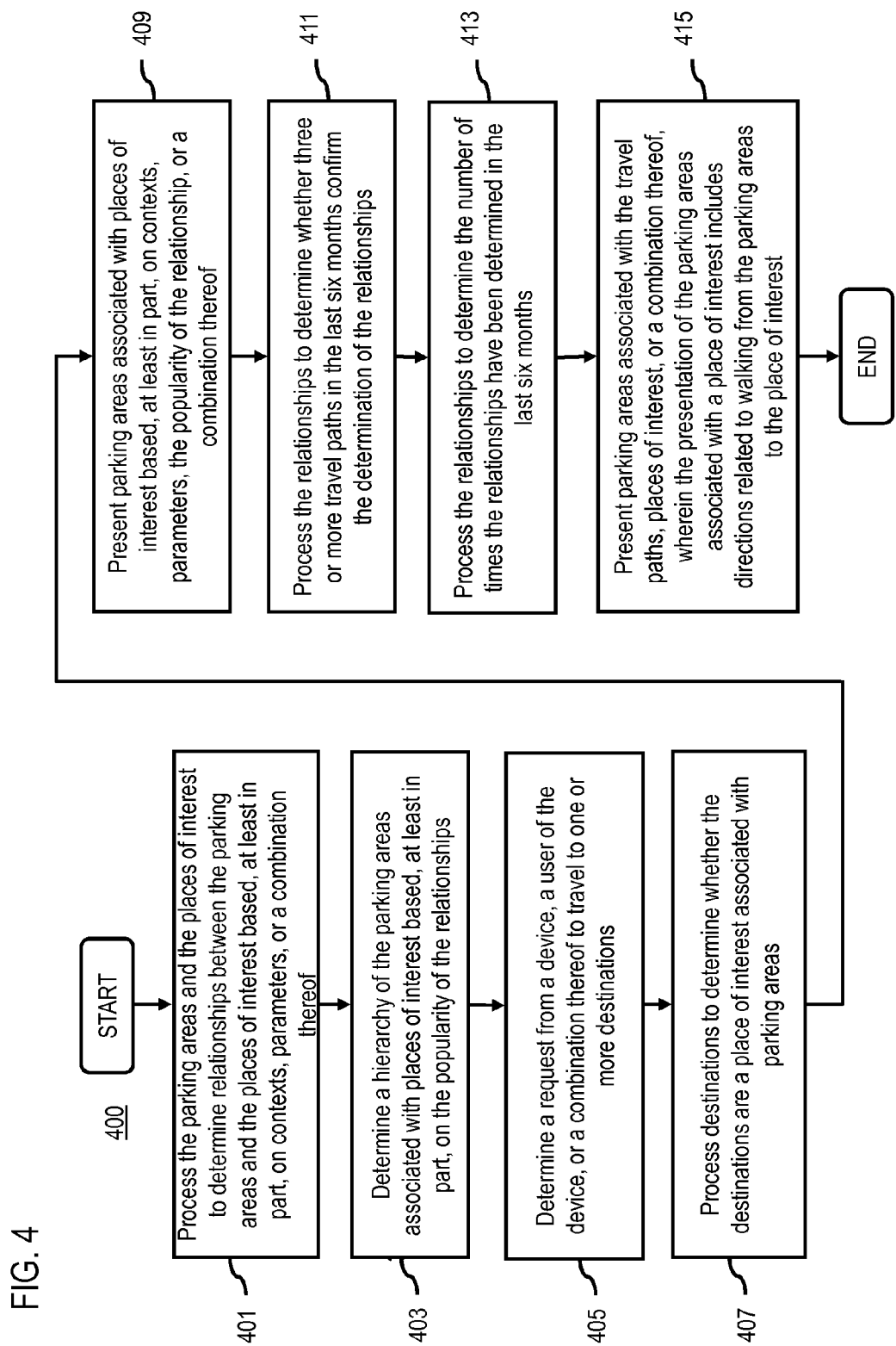
Figure 7:
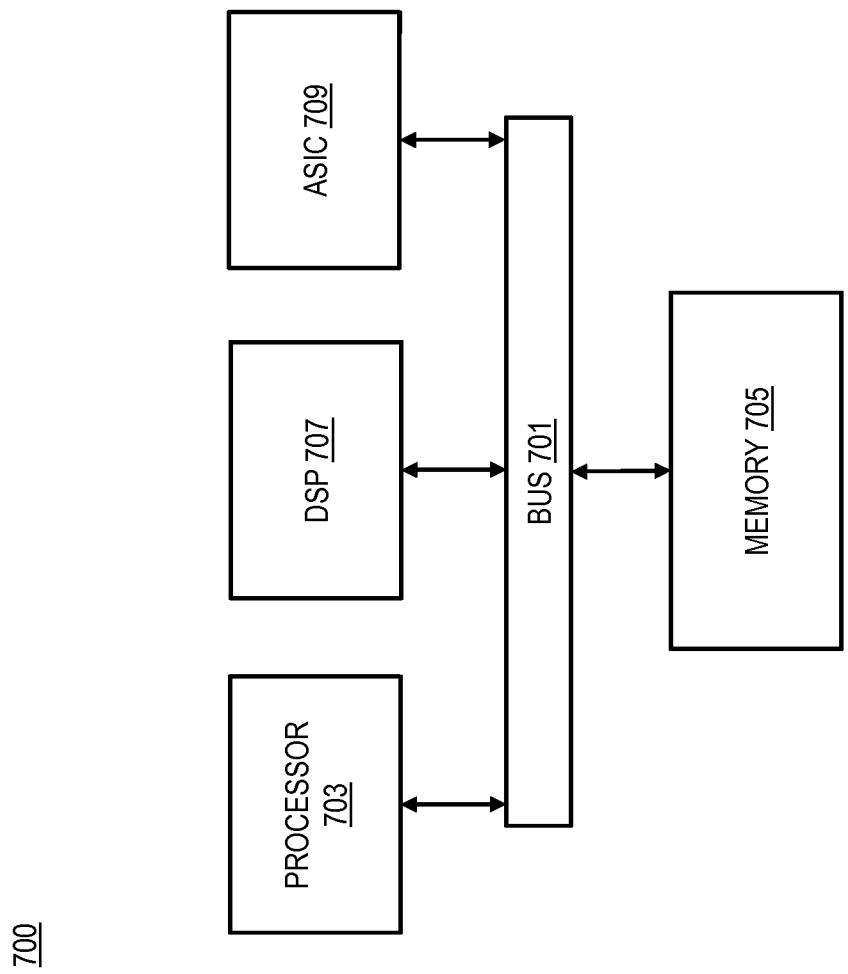
FIG. 7 is a diagram of a chip set that can be used to implement an embodiment of the invention.

FIGS. 3 and 4 are flowcharts of processes for determining parking information for a place of interest, according to one embodiment. FIG. 3 depicts a process 300 of processing and/or facilitating a processing of one or more trace results, one or more travel paths, or a combination thereof to determine one or more parking areas associated with a place of interest. In one embodiment, the travel platform 103 performs the process 300 and is implemented in, for instance, a chip set including a processor and a memory as shown in FIG. 7. In step 301, the travel platform 103 processes and/or facilitates a processing of one or more trace results associated with a device, a user of the device, or a combination thereof to determine one or more travel paths, one or more places of interest, or a combination thereof. By way of example, the one or more trace results are produced by one or more location-based technologies (e.g., GPS receivers, cellular triangulation, A-GPS, etc.) associated with a mobile device (e.g., a mobile phone) during one or more travel paths. In one embodiment, the trace results are associated with GPS receivers within a mobile device (e.g., a UE 101) during one or more travel paths between a starting destination (e.g., a home or office) and a place of interest (e.g., a restaurant, a cinema, a stadium, etc.).

In step 303, the travel platform 103 processes and/or facilitates a processing of the one or more travel paths to determine one or more parking areas associated with the one or more places of interest. By way of example, the one or more parking areas may be associated with a restaurant, a cinema, a stadium, etc. and typically accommodate the parking of a number of motor vehicles (e.g., cars, motorcycles, trucks, etc.).

In step 305, the travel platform 103 causes, at least in part, a presentation of the one or more parking areas associated with the one or more travel paths, the one or more places of interest, or a combination thereof. In one embodiment, the one or more parking areas are presented to a user through a graphical user interface (GUI) of a mobile device (e.g., a mobile phone). In another example, the one or more parking areas may be presented through the GUI of an in-dash GPS navigation system that works in connection with the mobile device via a wireless communication network (e.g., Bluetooth®).

In step 307, the travel platform 103 processes and/or facilitates a processing of the one or more travel paths to determine at least one driving segment and at least one walking segment based, at least in part, on the speed of the one or more travel paths. By way of example, if the travel platform 103 determines that the one or more travel paths indicate an average speed normally associated with driving, the travel platform 103 can determine with reasonable probability that the one or more travel paths represents at least one driving segment between a starting destination (e.g., a home or office) and one or more parking areas associated with the place of interest (e.g., a restaurant). Likewise, if the travel platform 103 determines that the one or more travel paths indicates an average speed normally associated with walking (e.g., 2-4 miles per hour), the travel platform 103 can determine with reasonable probability that the one or more travel paths represents at least one walking segment between a starting destination (e.g., one or more parking areas) and a place of interest. In one embodiment, the transition between the at least one driving segment and the at least one walking segment indicates the location where a user parked a vehicle and may also indicate a parking area related to a place of interest. In one embodiment, the correlation data between one or more parking areas and a place of interest is considered valid if more than three independent GPS traces confirm the same correlation within a recent period of time (e.g., over the last six months). As previously discussed, the travel platform 103 can adjust the calculus for determining the validity of the correlation between a parking area and a place of interest based on the number of GPS traces and/or correlations the travel platform 103 determines within the one or more databases. Therefore, if a user stopped on the side of the road because his or her vehicle ran out of gas, over a period of time, the travel platform 103 would not consider this location a valid parking area related to a place of interest.

In step 309, the travel platform 103 processes and/or facilitates a processing of an end of the at least one driving segment to determine whether the end of the at least one driving segment is a parking area based, at least in part, on one or more databases, one or more parameters, or a combination thereof. As previously discussed, the end of the at least one driving segment indicates the location where a user parked a vehicle. In one embodiment, the travel platform 103 compares the geographic coordinates of the end location determined by the GPS traces with the geographic coordinates associated with one or more parking areas related to a place of interest already stored in one or more databases. If the travel platform 103 determines that the geographic coordinates associated with the end of the at least one driving segment are not already stored within the one or more databases, the travel platform 103 can cause, at least in part, a storage of the geographic coordinates associated with the location for future reference and/or further validation.

In step 311, the travel platform 103 processes and/or facilitates a processing of an end of the at least one walking segment to determine whether the end of the at least one walking segment is a place of interest based, at least in part, on one or more databases, one or more parameters, or a combination thereof. In one embodiment, when a user enters an enclosed building (e.g., a restaurant, cinema, or stadium) the GPS traces will no longer be available to the travel platform 103. Similar to the determination by the travel platform 103 related to an end of the at least one driving segment, the travel platform 103 also can make a determination regarding the geographic coordinates associated with the location where the travel platform 103 is no longer able to determine GPS traces. In one embodiment, the travel platform 103 compares the geographic coordination of the end location determined by GPS traces with geographic coordinates associated with one or more places of interest (e.g., a restaurant) already stored within one or more databases. As previously discussed, if the travel platform 103 determines that the geographic coordinates associated with the end of the at least one walking segment are not already stored within one or more databases, the travel platform 103 can cause, at least in part, a storage of the geographic coordinates associated with the location for future reference and/or further validation.

In step 313, the travel platform 103 processes and/or facilitates a processing of the trace results associated with the one or more travel paths to determine the origin of the at least one driving segment and the approximate end of the at least one driving segment. As previously discussed, the origin of the at least one driving segment of one or more travel paths is the starting destination of the one or more travel paths (e.g., a home or office) and the end of the at least one driving segment is the location of the transition between the at least one driving segment of one or more travels paths and the at least one walking segment of the one or more travel paths (i.e., the location where a user parks a vehicle). In one embodiment, the travel platform 103 determines the origin of the at least one driving segment based, at least in part, on an activation of one or more location-based applications (e.g., turn-by-turn navigation) associated with a mobile device (e.g., a mobile phone) and/or the speed of the one or more travel paths. In one embodiment, the travel platform 103 determines the approximate end of the at least one driving segment based, at least in part, on the speed of the one or more travel paths and/or a processing of location-based data (e.g., GPS traces) associated with a mobile device.

In step 315, the travel platform 103 causes, at least in part, a presentation of the one or more parking areas associated with the one or more places of interest at the origin of the at least one driving segment, at the approximate end of the at least one driving segment, periodically, according to a schedule, on demand, or a combination thereof. By way of example, in one embodiment, the one or more parking areas associated with a place of interest may already be stored within one or more databases. In this instance, when a user first enters the address of the place of interest into one or more navigation applications associated with a mobile device (e.g., a mobile phone), the travel platform 103 may cause, at least in part, the presentation of one or more parking areas associated with the place of interest. In one embodiment, where the travel platform 103 first needs to determine parking information for a place of interest, the travel platform 103 may cause, at least in part, a presentation of one or more parking areas on a mobile device at the approximate end of the at least one driving segment to alert a user that the one or more parking areas will be coming into view shortly.

In step 317, the travel platform 103 causes, at least in part, a storage of the one or more trace results, the one or more travel paths, the one or more parking areas, the one or more places of interest, or a combination thereof in one or more databases. By way of example, the travel platform 103 can use the one or more trace results, the one or more travel paths, the one or more parking areas, the one or more places of interest stored in the one or more databases to determine that one or more parking areas are already associated with a place of interest selected by a user. In another example, the travel platform 103 can use the one or more trace results, the one or more travel paths, the one or more parking areas, the one or more places of interest stored in the one or more databases to determine a hierarchy of the one or more parking areas associated with one or more places of interest based, at least in part, on the popularity of the one more parking areas, wherein the popularity of the one or more parking areas is determined by the travel platform 103 based, at least in part, on the number of GPS traces stored over the last six months in the one or more databases that show the same correlation between the one or more parking areas and the place of interest. Further, in one embodiment, the travel platform 103 can use the one or more trace results, the one or more travel paths, the one or more parking areas, the one or more places of interest stored in the one or more databases for determining one or more relationships between one or more parking areas and one or more places of interest in the future.

In step 319, the travel platform processes and/or facilitates a processing of one or more trace results associated with a device, a user of the device, or a combination thereof, wherein the one or more trace results include, at least in part, GPS information, cellular identification, A-GPS, or a combination thereof. By way of example, the one or more trace results are determined from geographic and temporal information obtained from one or more location-based technologies (GPS receivers, cellular triangulation, A-GPS, etc.) associated with a mobile device (e.g., mobile phone).

FIG. 4 depicts a process 400 of determining one or more relationships between one or more parking areas related to one or more places of interest. In one embodiment, the travel platform 103 performs the process 400 and is implemented in, for instance, a chip set including a processor and a memory as shown in FIG. 7. In step 401, the travel platform 103 processes and/or facilitates a processing of the one or more parking areas and the one or more places of interest to determine one or more relationships between the one or more parking areas and the one or more places of interest based, at least in part, on one or more contexts, one or more parameters, or a combination thereof. By way of example, the one or more contexts between the one or more parking areas and the one or more places of interest may include cost, accessibility, popularity, etc. In another example, the one or more parameters between the one or more parking areas and the one or more places of interest may include the proximity of the one or more parking areas to a place of interest, the number of cars permitted to park within the parking area, the number of handicapped parking spaces available, etc.

In step 403, the travel platform 103 determines a hierarchy of the one or more parking areas associated with one or more places of interest based, at least in part, on the popularity of the one or more relationships. In one embodiment, the travel platform 103 determines the popularity of the one or more relationships based, at least in part, on the number of GPS traces that showed the same one or more relationships over the last six months. By way of example, if the travel platform 103 determines over the last six months that 50% of all drivers en route to restaurant "ABC" park their vehicles in parking area "A", 30% of the remaining drivers park their vehicles in parking area "B", and the remaining drivers park their vehicles in parking area "C", the travel platform 103 may determine to recommend and/or promote the best parking areas related to restaurant "ABC" in the order "A", "B", and "C", respectively.

In step 405, the travel platform 103 determines a request from a device, a user of the device, or a combination thereof to travel to one or more destinations. By way of example, the one or more destinations may include one or more places of interest (e.g., a restaurant, a cinema, a stadium, etc.) that a user can drive to from one or more starting destinations (e.g., a home or office).

In step 407, the travel platform 103 processes and/or facilitates a processing of one or more destinations to determine whether the one or more destinations is a place of interest associated with one or more parking areas. As previously discussed, in one embodiment, the travel platform 103 may determine one or more parking areas are already correlated with a place of interest (e.g., a restaurant) determined by a user based, at least in part, on parking information stored within one or more databases, available from one or more mapping and/or navigation services, or a combination thereof. In this instance, the travel platform 103 can present the one or more parking areas to a user without having to first determine one or more parking areas associated with a place of interest. In another embodiment, the travel platform 103 may need to first determine one or more parking areas associated with a place of interest if the one or more parking areas are not already correlated with the place of interest determined by the user.

In step 409, the travel platform 103 causes, at least in part, a presentation of the one or more parking areas associated with the one or more places of interest based, at least in part, on the one or more context, the one or more parameters, the popularity of the relationship, or a combination thereof. By way of example, a user may determine to view one or more parking areas associated with a place of interest based on one or more contexts, one or more parameters, or a combination thereof such as popularity, accessibility (e.g., availability of one or more handicapped parking spaces), cost (e.g., free parking or paid parking), etc.

In step 411, the travel platform 103 processes and/or facilitates a processing of the one or more relationships to determine whether three or more travel paths in a recent period of time confirm the determination of the one or more relationships. In one embodiment, if the travel platform 103 determines the one or more relationships between one or more parking areas and a place of interest (e.g., a restaurant) based, at least in part, on more than three independent GPS traces within a recent period of time (e.g., six months), then the travel platform 103 determines that the one or more relationships is valid. More specifically, the travel platform 103 can adjust the calculus for determining the validity of the correlation between a parking area and a place of interest based on the number of GPS traces and/or correlations the travel platform 103 determines within one or more databases. By way of example, if the travel platform 103 determines a significant number of GPS traces for a particular correlation, the travel platform can reduce the validation period from six months to three months or even a few weeks to determine the validity of the correlation. In addition, the travel platform 103 can store the one or more valid relationships in one or more databases and discard any relationships that the travel platform 103 determines are invalid. By way of example, a user of a vehicle may run out of gas and be forced to park the vehicle on the side of a road. In this instance, the travel platform 103 may still process the one or more travel paths to determine at least one driving segment and possibly one walking segment associated with the one or more travel paths, but the travel platform 103 will unlikely be able to correlate the end of the at least one driving segment with one or more parking areas in one or more databases or correlate the travel path with one or more relationships between one or more parking areas and a place of interest. Accordingly, the travel platform 103 will discard the travel path as invalid.

In step 413, the travel platform 103 processes and/or facilitates a processing of the one or more relationships to determine the number of times the one or more relationships have been determined in the last six months. As previously discussed, in one embodiment, the travel platform 103 determines the popularity of the one or more relationships between one or more parking areas and one or more places of interest based, at least in part, on the number of GPS traces from different users stored within the one or more databases that show the same correlation over the last six months.

In step 415, the travel platform 103 causes, at least in part, a presentation of the one or more parking areas associated with one or more travel paths, one or more places of interest, or a combination thereof, wherein the presentation of the one or more parking areas associated with a place of interest includes one or more directions related to walking from the one or more parking areas to the place of interest. By way of example, the travel platform 103 can determine one or more walking directions from the parking area to the place of interest from one or more databases, one or more mapping and/or navigation services, or a combination thereof and then present the one or more walking directions to a user at the onset of the user's walk, periodically, according to a schedule, on demand, or a combination thereof. In one embodiment, the travel platform 103 presents one or more walking directions to a user based, at least in part, on the popularity of the walk (i.e., number of GPS traces that also determined the same walk between a parking area and a correlated place of interest within the last six months).

FIG. 5 is a diagram of user interfaces utilized in the processes of FIGS. 3 and 4, according to various embodiments. As shown, the example user interfaces of FIG. 5 include one or more user interface elements and/or functionalities created and/or modified based, at least in part, on information, data, and/or signals resulting from the processes (e.g., processes 300 and 400) described with respect to FIGS. 3 and 4. More specifically, FIG. 5 illustrates two user interfaces (e.g., interfaces 501 and 503) with two different determinations regarding one or more parking areas associated with a place of interest (e.g., a train station). As shown in interface 501, a user has activated one or more navigation applications (e.g., turn-by-turn navigation) associated with a mobile device (e.g., a mobile phone) on Apr. 11, 2011 in order to determine route guidance information from a starting place (e.g., a home or office) to a place of interest (e.g., a train station). As shown in interface 501, the travel platform 103 is unable to determine one or more parking areas correlated with the place of interest based, at least in part, on one or more trace results, one or more travel paths, one or more parking areas, one or more places of interest, or a combination thereof already stored within one or more databases. In this instance, the one or more trace results, the one or more travel paths, or a combination thereof associated with the device (e.g., GPS traces) between the starting destination and the place of interest will be the first location-based data associated with the particular place of interest and can be made available by the travel platform 103 for future reference. In contrast, as shown in interface 503, the same user has activated one or more navigation applications associated with a mobile device on Dec. 11, 2011 (more than six months later) in order to once again determine route guidance information from a starting point (e.g., a home or office) to the same place of interest—Southwark Station. In this instance, the travel platform 103 is able to present to the user in interface 503 the fact that the parking area north-west, for example, of Southwark Station is the preferred parking area relative to the one or more other parking areas to the east, for example, of the station based, at least in part, one or more contexts, one or more parameters, the popularity of the relationship, or a combination thereof.

The processes described herein for determining parking information for a place of interest may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
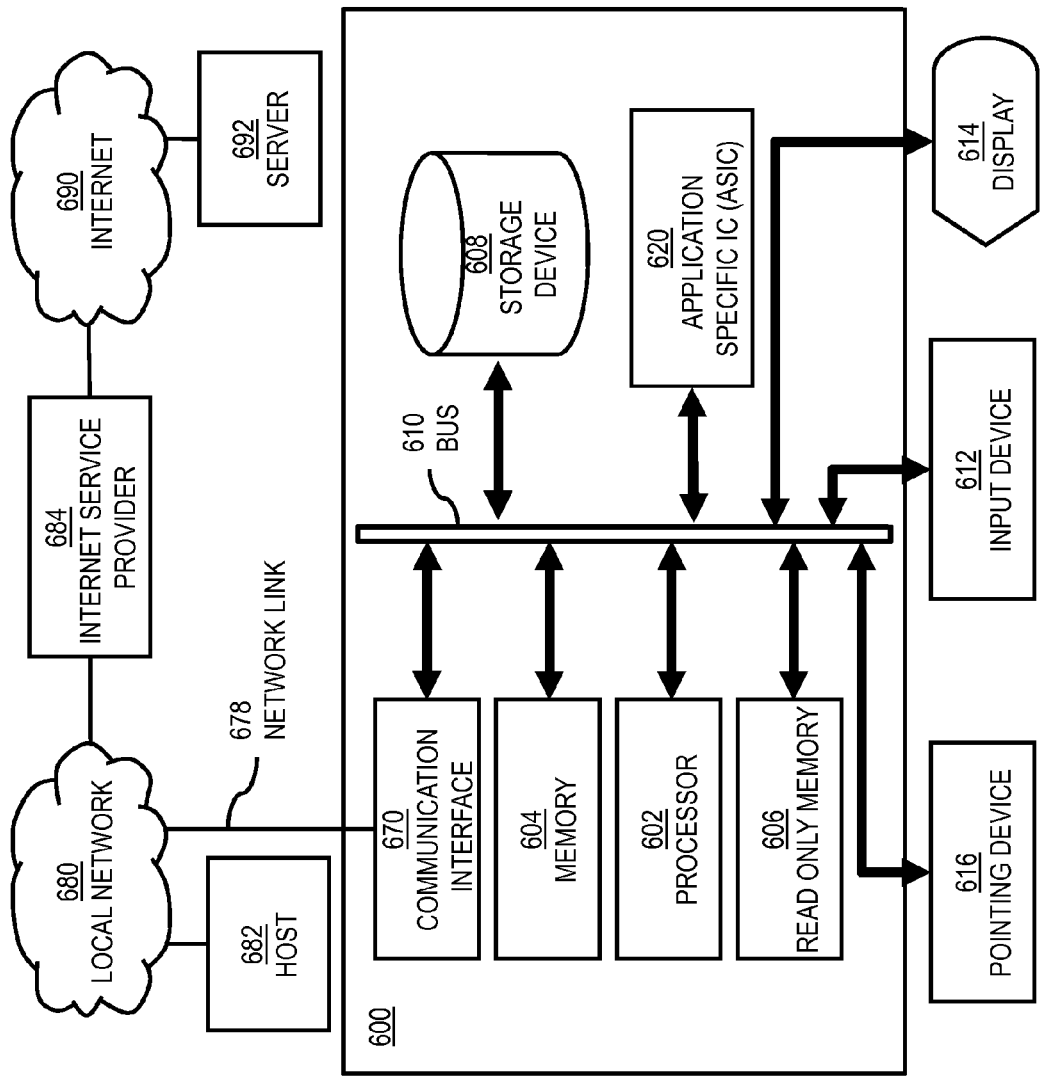
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to determine parking information for a place of interest as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of determining parking information for a place of interest.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to determine parking information for a place of interest. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for determining parking information for a place of interest. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for determining parking information for a place of interest, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing parking information for a place of interest to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to determine parking information for a place of interest as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of determining parking information for a place of interest.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to determine parking information for a place of interest. The memory 705 also stores the data associated with or generated by the execution of the inventive steps.

Figure 8:
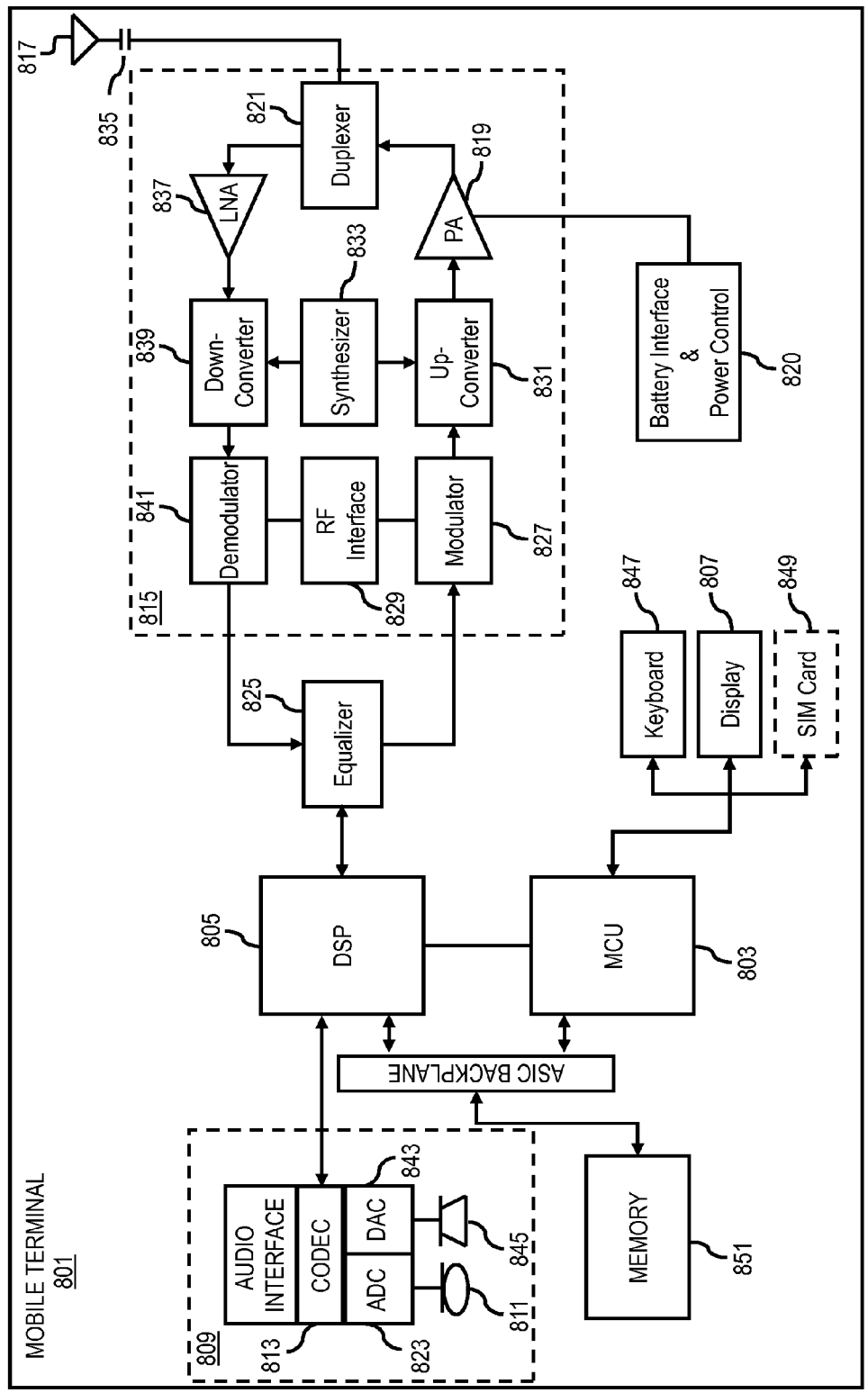
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of determining parking information for a place of interest. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of determining parking information for a place of interest. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to determine parking information for a place of interest. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and or (2) information and or (3) at least one signal, the (1) data and or (2) information and or (3) at least one signal based, at least in part, on the following:
    a processing of one or more trace results associated with a device, a user of the device, or a combination thereof to determine one or more travel paths, one or more places of interest, or a combination thereof;
    a processing of the one or more travel paths to determine one or more parking areas associated with the one or more places of interest; and
    a presentation of the one or more parking areas associated with the one or more travel paths, the one or more places of interest, or a combination thereof.

2. A method of claim 1, wherein the (1) data and or (2) information and or (3) at least one signal are further based, at least in part, on the following:
    a processing of the one or more travel paths to determine at least one driving segment and at least one walking segment based, at least in part, on the speed of the one or more travel paths.

3. A method of claim 2, wherein the (1) data and or (2) information and/or (3) at least one signal are further based, at least in part, on the following:
    a processing of an end of the at least one driving segment to determine whether the end of the at least one driving segment is a parking area based, at least in part, on one or more databases, one or more parameters, or a combination thereof; and
    a processing of an end of the at least one walking segment to determine whether the end of the at least one walking segment is a place of interest based, at least in part, on one or more databases, one or more parameters, or a combination thereof.

4. A method of claim 1, wherein the (1) data and/or (2) information and/or (3) at least one signal are further based, at least in part, on the following:
    a processing of the one or more parking areas and the one or more places of interest to determine one or more relationships between the one or more parking areas and the one or more places of interest based, at least in part, on one or more contexts, one or more parameters, or a combination thereof; and
    at least one determination of a hierarchy of the one or more parking areas associated with one or more places of interest based, at least in part, on the popularity of the one or more relationships.

5. A method of claim 1, wherein the (1) data and or (2) information and/or (3) at least one signal are further based, at least in part, on the following:
    at least one determination of a request from a device, a user of the device, or a combination thereof to travel to one or more destinations;
    a processing of the one or more destinations to determine whether the one or more destinations is a place of interest associated with one or more parking areas; and
    a presentation of the one or more parking areas associated with the one or more places of interest based, at least in part, on the one or more context, the one or more parameters, the popularity of the relationship, or a combination thereof.

6. A method of claim 5, wherein the (1) data and or (2) information and/or (3) at least one signal are further based, at least in part, on the following:
    a processing of the trace results associated with the one or more travel paths to determine the origin of the at least one driving segment and the approximate end of the at least one driving segment; and
    a presentation of the one or more parking areas associated with the one or more places of interest at the origin of the at least one driving segment, at the approximate end of the at least one driving segment, periodically, according to a schedule, on demand, or a combination thereof.

7. A method of claim 4, wherein the (1) data and or (2) information and/or (3) at least one signal are further based, at least in part, on the following:
    a processing of the one or more relationships to determine whether three or more travel paths in a recent period of time confirm the determination of the one or more relationships; and
    a processing of the one or more relationships to determine the number of times the one or more relationships have been determined in the last six months.

8. A method of claim 1, wherein the presentation of the one or more parking areas associated with a place of interest includes one or more directions related to walking from the one or more parking areas to the place of interest.

9. A method of claim 1, wherein the (1) data and or (2) information and or (3) at least one signal are further based, at least in part, on the following:
    a storage of the one or more trace results, the one or more travel paths, the one or more parking areas, the one or more places of interest, or a combination thereof in one or more databases.

10. An apparatus comprising:
    at least one processor; and
    at least one memory including computer program code for one or more programs,
    the at least one memory and the computer program code configured to, with the at least one processor, cause the apparatus to perform at least the following, process and or facilitate a processing of one or more trace results associated with a device, a user of the device, or a combination thereof to determine one or more travel paths, one or more places of interest, or a combination thereof process and or facilitate a processing of the one or more travel paths to determine one or more parking areas associated with the one or more places of interest; and cause, at least in part, a presentation of the one or more parking areas associated with the one or more travel paths, the one or more places of interest, or a combination thereof.

11. A method of claim 10, wherein the one or more trace results include, at least in part, GPS information, cellular identification, A-GPS, or a combination thereof.

12. An apparatus of claim 10, wherein the apparatus is further caused to:

process and or facilitate a processing of the one or more travel paths to determine at least one driving segment and at least one walking segment based, at least in part, on the speed of the one or more travel paths.

13. An apparatus of claim 12, wherein the apparatus is further caused to:

process and or facilitate a processing of an end of the at least one driving segment to determine whether the end of the at least one driving segment is a parking area based, at least in part, on one or more databases, one or more parameters, or a combination thereof and process and or facilitate a processing of an end of the at least one walking segment to determine whether the end of the at least one walking segment is a place of interest based, at least in part, on one or more databases, one or more parameters, or a combination thereof.

14. An apparatus of claim 10, wherein the apparatus is further caused to:

process and or facilitate a processing of the one or more parking areas and the one or more places of interest to determine one or more relationships between the one or more parking areas and the one or more places of interest based, at least in part, on one or more contexts, one or more parameters, or a combination thereof and determine a hierarchy of the one or more parking areas associated with one or more places of interest based, at least in part, on the popularity of the one or more relationships.

15. An apparatus of claim 10, wherein the apparatus is further caused to:

determine a request from a device, a user of the device, or a combination thereof to travel to one or more destinations;

process and or facilitate a processing of the one or more destinations to determine whether the one or more destinations is a place of interest associated with one or more parking areas; and cause, at least in part, a presentation of the one or more parking areas associated with the one or more places of interest based, at least in part, on the one or more context, the one or more parameters, the popularity of the relationship, or a combination thereof.

16. An apparatus of claim 15, wherein the apparatus is further caused to:

process and or facilitate a processing of the trace results associated with the one or more travel paths to determine the origin of the at least one driving segment and the approximate end of the at least one driving segment; and cause, at least in part, a presentation of the one or more parking areas associated with the one or more places of interest at the origin of the at least one driving segment, at the approximate end of the at least one driving segment, periodically, according to a schedule, on demand, or a combination thereof.

17. An apparatus of claim 14, wherein the apparatus is further caused to:

process and or facilitate a processing of the one or more relationships to determine whether three or more travel paths in a recent period of time confirm the determination of the one or more relationships; and process and/or facilitate a processing of the one or more relationships to determine the number of times the one or more relationships have been determined in the last six months.

18. An apparatus of claim 10, wherein the presentation of the one or more parking areas associated with a place of interest includes one or more directions related to walking from the one or more parking areas to the place of interest.

19. An apparatus of claim 10, wherein the apparatus is further caused to:

cause, at least in part, a storage of the one or more trace results, the one or more travel paths, the one or more parking areas, the one or more places of interest, or a combination thereof in one or more databases.

20. An apparatus of claim 10, wherein the one or more trace results include, at least in part, GPS information, cellular identification, A-GPS, or a combination thereof.

* * * * *